US012804614B2

(12) United States Patent
Zhang et al.

(10) Patent No.: US 12,804,614 B2
(45) Date of Patent: Nov. 17, 2026

(54) RESOURCE RESELECTION METHOD AND APPARATUS, DEVICE AND STORAGE MEDIUM

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN); Teng Ma, Dongguan (CN); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 362 days.

(21) Appl. No.: 18/693,661

(22) PCT Filed: Jul. 21, 2021

(86) PCT No.: PCT/CN2021/107719
§ 371 (c)(1),
(2) Date: Mar. 20, 2024

(87) PCT Pub. No.: WO2023/000233
PCT Pub. Date: Jan. 26, 2023

(65) Prior Publication Data
US 2024/0323919 A1 Sep. 26, 2024

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04W 4/44* (2018.02); *H04W 28/26* (2013.01);
(Continued)

(58) Field of Classification Search
CPC ..... H04W 72/02; H04W 28/26; H04W 72/40; H04W 74/0816; H04W 92/18;
(Continued)

(56) References Cited

U.S. PATENT DOCUMENTS

2022/0132558 A1* 4/2022 Lee ........................ H04W 24/10
2022/0400469 A1* 12/2022 Li ...................... H04W 74/0808
(Continued)

FOREIGN PATENT DOCUMENTS

CN 109565791 A 4/2019
CN 111901783 A 11/2020
(Continued)

OTHER PUBLICATIONS

International search report of PCT application No. PCT/CN2021/107719 issued on Apr. 19, 2022.
(Continued)

*Primary Examiner* — Michael K Phillips
(74) *Attorney, Agent, or Firm* — BAYES PLLC

(57) ABSTRACT

Provided is a resource reselection method. The method is applicable to a terminal adopting an autonomous resource selection mode. The method includes: triggering resource reselection for a sidelink process in a case that a number of transmission opportunities in each of sets of periodic transmission opportunities selected during a resource selection process is not less than 2 and first m transmission opportunities in n1 consecutive sets of periodic transmission opportunities are not used, m being not greater than a number of transmission opportunities in a same set of periodic transmission opportunities; wherein n1 is a value indicated by a first parameter.

12 Claims, 7 Drawing Sheets

(51) Int. Cl.

| | |
|---|---|
| ***H04W 4/44*** | (2018.01) |
| ***H04W 28/26*** | (2009.01) |
| ***H04W 72/40*** | (2023.01) |
| ***H04W 74/0816*** | (2024.01) |

(52) U.S. Cl.
CPC ....... *H04W 72/40* (2023.01); *H04W 74/0816* (2013.01)

(58) Field of Classification Search
CPC ...... H04W 4/44; H04L 1/1812; H04L 1/1887; H04L 1/1893
See application file for complete search history.

(56) References Cited

U.S. PATENT DOCUMENTS

| | | | | |
|---|---|---|---|---|
| 2023/0083274 | A1* | 3/2023 | Lee | H04L 1/1822 |
| 2023/0199838 | A1* | 6/2023 | Lee | H04W 74/0808 370/329 |

FOREIGN PATENT DOCUMENTS

| | | | |
|---|---|---|---|
| CN | 112637895 | A | 4/2021 |
| WO | 2020198317 | A1 | 10/2020 |
| WO | 2021030565 | A1 | 2/2021 |

OTHER PUBLICATIONS

3GPP TS 36.321 V15.7.0 (Sep. 2019), Technical Specification, 3rd Generation Partnership Project; Technical Specification Group Radio Access Network; Evolved Universal Terrestrial Radio Access (E-UTRA); Medium Access Control (MAC) protocol specification (Release 15), Sep. 2019, entire document.

3GPP TS 38.321 V16.4.0 (Mar. 2021), Technical Specification, 3rd Generation Partnership Project; Technical Specification Group Radio Access Network; NR; Medium Access Control (MAC) protocol specification (Release 16), Mar. 2021, entire document.

RAN2, LS on resource reselection trigger sl-reselectAfter, R2-2106625, 3GPP TSG RAN WG2 Meeting #114-e, May 27, 2021, entire document.

Vivo, R1-2106200, Discussion on mode-2 enhancements, 3GPP TSG RAN WG1 #105-e, May 27, 2021, entire document.

* cited by examiner

RESOURCE RESELECTION METHOD AND APPARATUS, DEVICE AND STORAGE MEDIUM

CROSS-REFERENCE TO RELATED APPLICATION

This application is a US national stage of international application No. PCT/CN2021/107719, filed on Jul. 21, 2021, the entire contents of which are incorporated herein by reference.

TECHNICAL FIELD

The present disclosure relates to the technical field of mobile communications, and in particular, relates to a resource reselection method and apparatus, a device and a storage medium.

BACKGROUND

In the vehicle-to-everything (V2X) communication scenario, an autonomous resource selection mode of the terminal is supported. The autonomous resource selection mode means that the terminal autonomously selects a transmission opportunity (or resource) in a resource pool and uses the selected transmission opportunity for sidelink data transmission.

SUMMARY

Embodiments of the present disclosure provide a resource reselection method and apparatus, a device, and a storage medium that can rationally trigger resource reselection in an NR system based on a parameter sl-ReselectAfter. The described technical solutions are as follows:

According to some embodiments of the present disclosure, a resource reselection method is provided. The method is applicable to a terminal adopting an autonomous resource selection mode in V2X. The method includes:

triggering resource reselection based on a first parameter and first information in the case that the first parameter is configured.

According to some embodiments of the present disclosure, a resource reselection apparatus is provided. The apparatus adopts an autonomous resource selection mode in V2X. The apparatus includes:

a resource reselection module, configured to trigger resource reselection based on a first parameter and first information in the case that the first parameter is configured.

According to some embodiments of embodiments of the present disclosure, a terminal is provided. The device includes a processor and a memory. The memory has a computer program stored therein. The processor, when loading and running the computer program, is caused to perform the resource reselection method.

According to some embodiments of the present disclosure, a non-transitory computer-readable storage medium is provided. The storage medium has a computer program stored therein. The computer program, when loaded and run by a processor, causes the processor to perform the resource reselection method.

According to some embodiments of the present disclosure, a chip is provided. The chip includes a programmable logic circuit and/or program instructions. The chip, when running on a computer device, is configured to perform the resource reselection method described above.

According to some embodiments of the present disclosure, a computer program product or a computer program is provided. The computer program product or the computer program includes computer instructions. The computer instructions are stored in a computer-readable storage medium. The computer instructions, when loaded and executed by a processor of a computer device from the computer-readable storage medium, cause the computer device to perform the resource reselection method described above.

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

Figure 1:
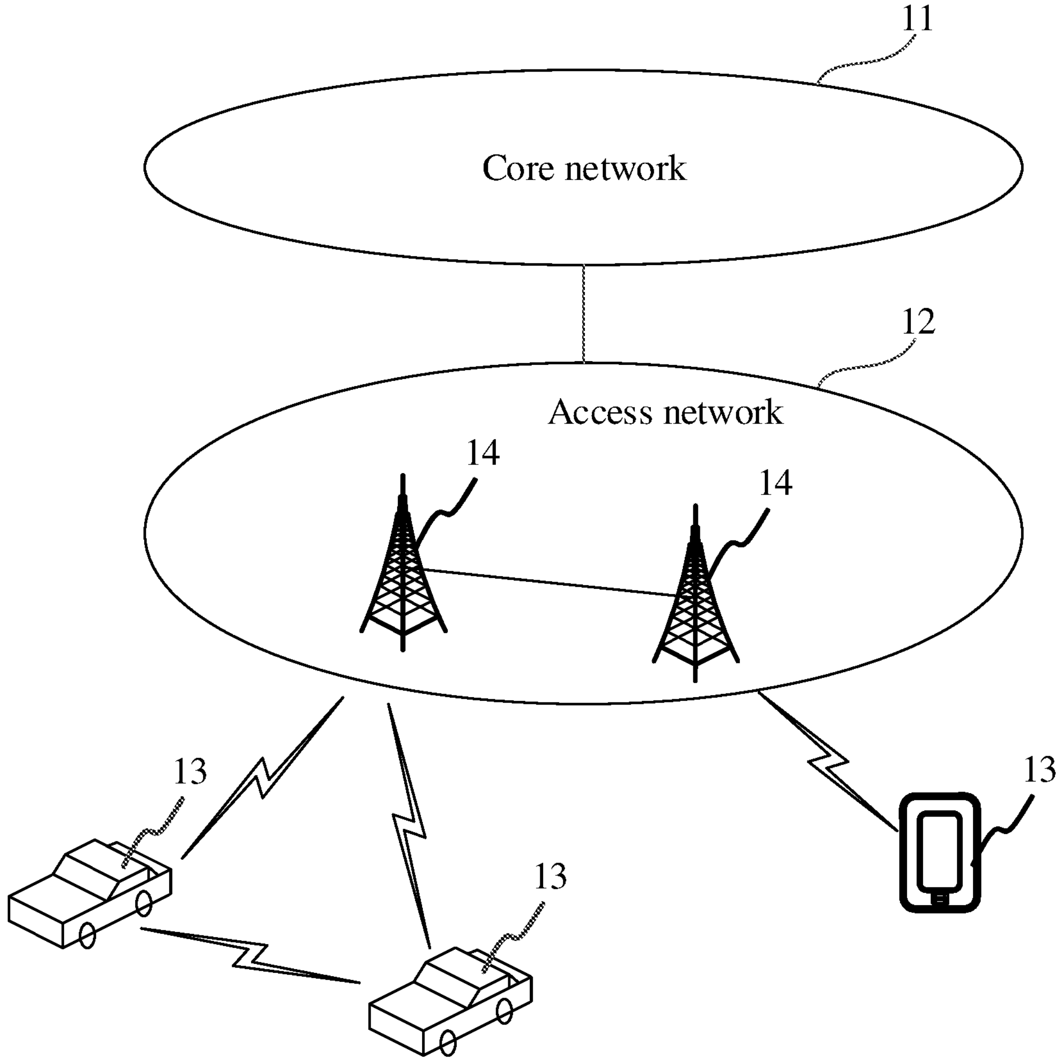
FIG. 1 is a schematic diagram of a network architecture according to some exemplary embodiments of the present disclosure.

For clearer descriptions of the objectives, technical solutions, and advantages of the present disclosure, embodiments of the present disclosure are described in detail hereinafter with reference to the accompanying drawings.

Exemplary embodiments are described hereinafter in detail, examples of which are represented in the accompanying drawings. When the following description relates to the accompanying drawings, the same numerals in the different accompanying drawings indicate the same or similar elements unless otherwise indicated. The implementations described in the following exemplary embodiments do not represent all implementations consistent with the present disclosure. Rather, they are only examples of apparatuses and methods consistent with some aspects of the present disclosure as detailed in the appended claims.

The network architecture as well as the service scenarios described in the embodiments of the present disclosure are for the purpose of more clearly illustrating the technical solutions of the embodiments of the present disclosure, and do not constitute a limitation on the technical solutions provided by the embodiments of the present disclosure, and a person of ordinary skill in the art may know that, with the evolution of the network architecture and the emergence of new service scenarios, the technical solutions provided by the embodiments of the present disclosure are equally applicable to similar technical problems.

The terms used in the present disclosure are used solely for the purpose of describing particular embodiments and are not intended to limit the present disclosure. The singular forms of "a," "an," and "the" used in the present disclosure and the appended claims are also intended to encompass the plural form, unless the context clearly indicates otherwise. It should also be understood that the term "and/or" as used herein refers to and encompasses any or all possible combinations of one or more of the associated listed items.

It should be understood that while the terms first, second, etc. may be employed in the present disclosure to describe various types of information, such information should not be limited to these terms. These terms are only intended to distinguish the same type of information from one another. For example, without departing from the scope of the present disclosure, a first parameter may also be referred to as a second parameter, and similarly, a second parameter may be referred to as a first parameter. Depending on the context, as used herein, the phrase "when" or "if" may be interpreted as "in the case that," "in a case that," or "upon," "upon determining" "in response to," or "in response to determining."

V2X communication includes vehicle-to-vehicle (V2V) communication, vehicle-to-infrastructure (V21) communication, and vehicle-to-people (V2P) communication. By supporting V2V, V21, and V2P communications, V2X can effectively enhance traffic safety, improve traffic efficiency, and enrich travel experience.

The use of existing cellular communication technologies to support V2X communications can effectively utilize deployed base stations, reduce equipment overhead, as well as facilitate the provision of services with quality of service (QOS) guarantees, thus being able to meet the needs of V2X services.

In R14 (Release14)/R15 (Release15) of long-term evolution (LTE), V2X communication is implemented based on cellular networks, specifically, the cellular-based V2X (C-V2X) technology. In C-V2X, communications between vehicle-mounted devices (e.g., vehicle-mounted terminals) and other devices can be relayed through base stations and core network devices, i.e., communications between vehicle-mounted devices and other devices are implemented over the communication links between terminals and base stations in the original cellular network, including uplink (UL) communications and downlink (DL) communications. Vehicle-mounted devices may also communicate with other devices directly over a direct link (also known as a sidelink) between the devices.

Sidelink communication is a device-to-device communication method with high spectral efficiency and low transmission delay. Sidelink supports two transmission modes. In a first transmission mode, the network device configures transmission resources for the terminal (vehicle-mounted device), and the terminal transmits data on the configured transmission resources over the sidelink. In a second transmission mode, the network device allocates a resource pool for the terminal, and the terminal selects one or more transmission resources in the resource pool autonomously for data transmission over the sidelink. Exemplarily, the terminal may select the transmission resources in the resource pool by means of sensing, or alternatively, select the transmission resources in the resource pool by means of random selection. Compared with the Uu interface communication, the sidelink communication features short latency and small overhead, and is very suitable for direct communication between the vehicle-mounted device and other peripheral devices that are geographically proximate.

With the development of 5G mobile communication technology, R16 of the 3rd Generation Partnership Project (3GPP) proposes the use of 5G new radio (NR) technology to implement the support of new services and scenarios for V2X, such as the support of vehicles platooning, extended sensors, advanced driving, and remote driving. Generally, 5G V2X sidelink can provide higher communication rates, shorter communication delays, and more reliable communication quality.

In a long-term evaluation (LTE) system, the terminal may reserve up to two transmission opportunities in each period. In the case that a parameter sl-ReselectAfter is configured for the resource pool, for a transmission opportunity reserved for a sidelink process, the reserved transmission opportunity is not used for sl-ReselectAfter consecutive sl-ReselectAfter times, and the terminal triggers resource reselection.

Compared to LTE, enhancements have been made to the autonomous resource selection mode in the new radio (NR) system. For example, the terminal may reserve up to 32 transmission opportunities in each period. How to trigger the resource reselection process at this time is a technical problem to be solved.

FIG. 1 illustrates a schematic diagram of a network architecture according to some exemplary embodiments of the present disclosure. In the network architecture as illustrated in FIG. 1, a core network 11, an access network 12, and a terminal 13 are included.

The core network 11 includes a plurality of core network devices. The functions of the core network devices are mainly to provide user connectivity, management of users, and bearer of services, and to serve as an interface from a bearer network to an external network. For example, the core network of a 5th generation (5G) NR system may include an access and mobility management function (AMF)

entity, a user plane function (UPF) entity, and a session management function (SMF) entity, and the like.

The access network 12 includes a plurality of access network devices 14. The access network in the 5G NR system may be referred to as a new generation-radio access network (NG-RAN). The access network device 14 is a device deployed in the access network 12 to provide wireless communication functions for the terminal 13. The access network device 14 may include various forms of macro base stations, micro base stations, relay stations, access points, and the like. The name of the device having the function of an access network device may vary in systems employing different wireless access technologies. For example, in a 5G NR system, the device is called a 5G base station (next generation NodeB, gNodeB or gNB). The name "access network device" may change as the communication technology evolves. For convenience of description, in the embodiments of the present disclosure, the above-described devices that provide wireless communication functions for the terminal 13 are collectively referred to as access network devices.

Typically, a plurality of terminals 13 are provided, and one or more terminals 13 may be distributed within the cell managed by each of the access network devices 14. The terminals 13 may include a variety of hand-held devices, vehicle-mounted devices, wearable devices, computing devices, or other processing devices connected to a wireless modem with wireless communication functions, as well as various forms of user equipments (UEs), mobile stations (MSs), or the like. For case of description, the devices mentioned above are collectively referred to as terminals. The access network device 14 communicates with the core network device using the over-the-air technology, such as an NG interface in the 5G NR system. The access network device 14 communicates with the terminal 13 using the over-the-air technology, such as a Uu interface.

The terminals 13 (e.g., the vehicle-mounted device and other device (e.g., other vehicle-mounted device, cellular phone, road side unit (RSU), or the like) may communicate with each other through a direct communication interface (e.g., a PC5 interface). Accordingly, a communication link established based on the direct communication interface may be referred to as a direct link or SL. SL transmission means that transmission of communication data is directly performed between the terminals over a sidelink. Unlike the traditional cellular system in which the communication data is received or transmitted through the access network device, SL transmission features short delay and small overhead, and is suitable for the communication between two terminals that are geographically proximate (e.g., a vehicle-mounted device and other peripheral device that are geographically proximate). It should be noted that in FIG. 1, only vehicle-to-vehicle communication in a V2X scenario is taken as an example, and the SL technology is applicable to various scenarios in which communication is directly performed between terminals. Alternatively, the terminal in the present disclosure refers to any kind of device that communicates using the SL technology.

The "5G NR system" in the embodiments of the present disclosure may also be referred to as a 5G system or an NR system, but a person skilled in the art may understand the meaning thereof. The technical solutions described in the embodiments of the present disclosure may be applicable to a 5G NR system or a subsequent evolutionary system of the 5G NR system.

The UE and the terminal in the embodiments of the present disclosure express the same meaning, and the two may be interchangeable.

The term "timeslot" in the embodiments of the present disclosure may also be referred to as a "slot".

The term "sensing timeslot" in the embodiments of the present disclosure may also be referred to as a "sensing occasion".

The term "domain" contained in the first sidelink control information or the second sidelink control information in the embodiments of the present disclosure may also be referred to as a "field". For example, the "time resource assignment" and "frequency resource assignment" domains may also be referred to as "time resource assignment" and "frequency resource assignment" fields.

Concerning SL transmission, 3GPP defines two transmission modes: mode A and mode B.

In mode A (also known as mode 1 or a base station scheduling mode), the transmission resources of the terminal are allocated by the access network device (e.g., the base station), and the terminal transmits the communication data on the sidelink according to the transmission resources allocated by the access network device, wherein the access network device may either allocate the transmission resources for the terminal for a single transmission, or the transmission resources for the terminal for a semi-static transmission.

In mode B (also known as mode 2 or a UE autonomous resource selection mode), the terminal selects transmission resources in the resource pool autonomously for transmission of communication data. Specifically, the terminal may select transmission resources in the resource pool by means of sensing, or select transmission resources in the resource pool by means of random selection.

The next section focuses on SL communication in an NR V2X system, where the terminal performs resource selection autonomously (i.e., mode B).

Figure 2:
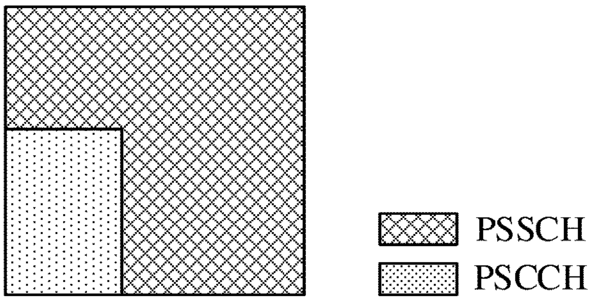
FIG. 2 exemplarily illustrates a schematic diagram of a physical layer structure for SL communication.

The physical layer structure of SL communication in the NR V2X system is shown in FIG. 2. The physical sidelink control channel (PSCCH) is configured to carry first sidelink control information. The physical sidelink shared channel (PSSCH) is configured to carry data and second sidelink control information. The PSCCH and the PSSCH are sent in the same timeslot. The first sidelink control information and the second sidelink control information described above may be two pieces of sidelink control information with different roles. For example, the first sidelink control information is carried in the PSCCH, which mainly contains domains related to resource sensing to facilitate resource exclusion and resource selection after decoding by other terminals. In the PSSCH, the second sidelink control information is carried in addition to data, which mainly includes domains related to data demodulation to facilitate other terminals to demodulate the data in the PSSCH.

In the NR V2X system, in mode B, the terminal autonomously selects transmission resources to transmit data. Resource reservation is then a prerequisite for resource selection.

Resource reservation means that the terminal sends the first sidelink control information in the PSCCH to reserve the resources to be used next. In the NR V2X system, resource reservation within a transport block (TB) is supported as well as resource reservation between TBs.

Figure 3:
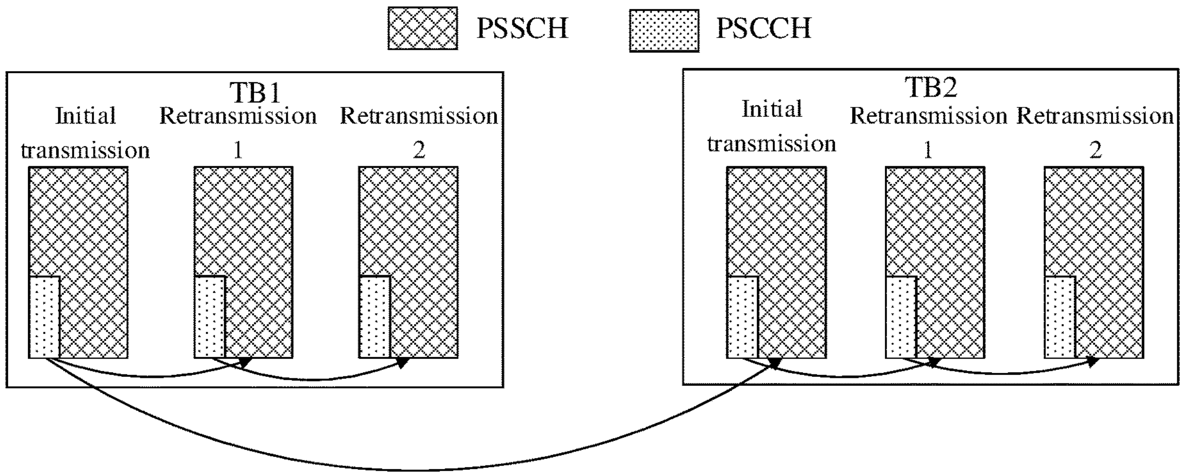
FIG. 3 exemplarily illustrates a schematic diagram of a time-frequency resource location reservation.

As shown in FIG. 3, the terminal sends the first sidelink control information, and indicates the N time-frequency resources (including the resources used for the current transmission) of the current TB using the "time resource assignment" and "frequency resource assignment" domains, wherein N≤Nmax. In NR V2X, Nmax is equal to 2 or 3. Further, the N indicated time-frequency resources shall be distributed within W timeslots. In NR V2X, W is equal to 32. For example, in TB1 illustrated in FIG. 3, the terminal transmits the first sidelink control information in the PSCCH at the same time as the terminal transmits the initial transmission data in the PSSCH, and indicate, by using the two domains, the locations of the time-frequency resources for the initial transmission and the retransmission 1 (i.e., at this time, N=2), i.e., the time-frequency resources for the retransmission 1 are reserved. Moreover, the initial transmission and the retransmission 1 are distributed within 32 timeslots in the time domain. Similarly, in TB1 shown in FIG. 3, the terminal indicates the time-frequency resource locations of the retransmission 1 and the retransmission 2 using the first sidelink control information sent in the PSCCH of the retransmission 1. The retransmission 1 and the retransmission 2 are distributed within 32 timeslots in the time domain.

At the same time, when transmitting the first sidelink control information, the terminal reserves resources between TBs by using the "resource reservation period" domain. For example, in FIG. 3, when transmitting the first sidelink control information of the initial transmission of TB1, the terminal indicates the time-frequency resource locations of the initial transmission and the retransmission 1 of TB1 by using the domains of "time resource allocation" and "frequency resource allocation", which are noted as {(t1, f1), (t2, f2)}, wherein t1 and t2 represent the time domain locations of resources of TB1 initial transmission and retransmission 1, and f1 and f2 represent the corresponding frequency domain locations. In the case that the value of the "resource reservation period" domain in the first sidelink control information is 100 ms, the sidelink control information (SCI) indicates both the time-frequency resources {(t1+100, f1), (t2+100, f2)}, which are used for transmissions of TB2 initial transmission and retransmission 1. Similarly, when transmitting the first sidelink control information sent in TB1 retransmission 1, the terminal also reserves the time-frequency resources for TB2 retransmission 1 and retransmission 2 by using the "resource reservation period" domain. In NR V2X, the possible values of the "resource reservation period" domain are 0, 1-99, 100, 200, 300, 400, 500, 600, 700, 800, 900, and 1000 milliseconds, which is more flexible than LTE V2X. However, in each resource pool, only e values of all these values are configured, and the terminal determines the possible values to use based on the resource pool used. The e values configured in the resource pool are indicated as a resource reservation period set M, and exemplarily, e is less than or equal to 16.

In addition, the inter-TB reservation may be activated or deactivated on a resource pool basis by means of network configuration or pre-configuration. When the inter-TB reservation is deactivated, the "resource reservation period" domain is not included in the first sidelink control information. In general, before triggering resource reselection, the value of the "resource reservation period" domain used by the terminal, that is, the resource reservation period, remains unchanged. The terminal reserves the resources of the next period for the transmission of another TB by using the "resource reservation period" domain in the first sidelink control information when sending the first sidelink control information, such that the periodic semi-persistent transmission is achieved.

When operating in mode B, the terminal may acquire the first sidelink control information sent by other terminals by sensing the PSCCH from other terminals, such that the resources reserved by the other terminals are acknowledged. When performing resource selection, the terminal excludes the resources reserved by the other terminals, such that resource collision is avoided.

In the NR V2X system, in mode B, the terminal needs to select resources autonomously.

Figure 4:
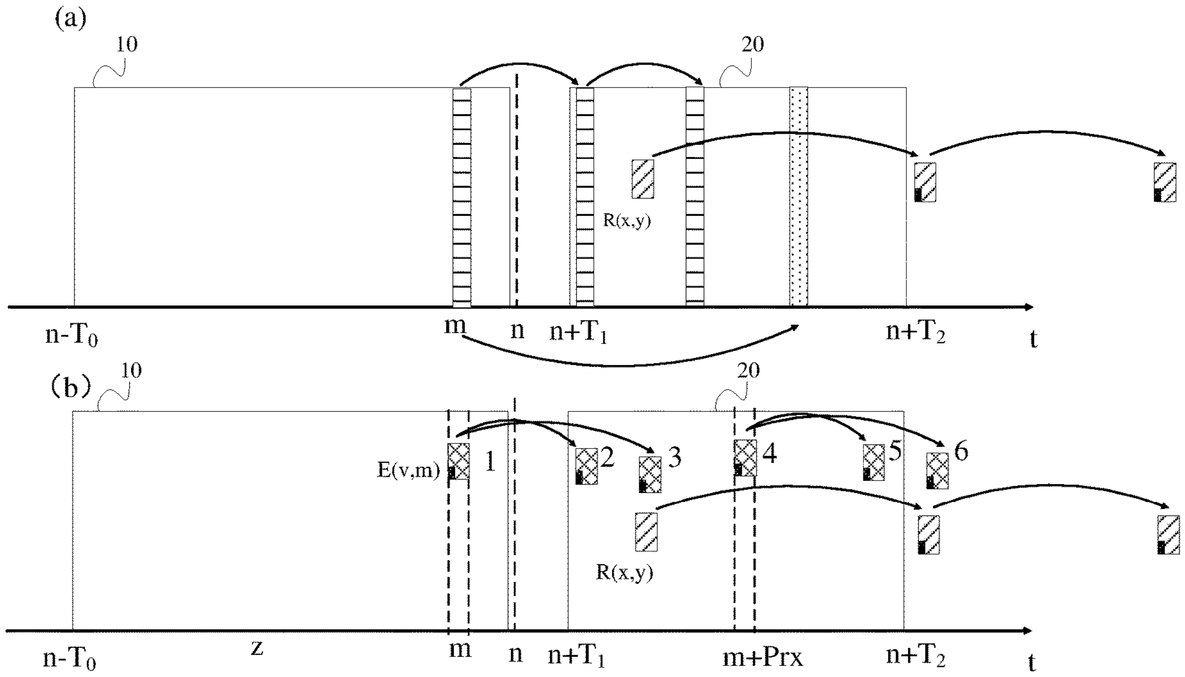
FIG. 4 exemplarily illustrates a schematic diagram of full sensing and resource selection.

As shown in FIG. 4, the terminal triggers resource selection or reselection in a timeslot n or the timeslot n is a timeslot in which the higher layer triggers the physical layer to report a candidate resource set, and a resource selection window 20 starts from n+T1 and ends at n+T2. 0<=T1<=Tproc, 1. When a subcarrier interval is 15, 30, 60, or 120 kHz, Tproc, 1 is 3, 5, 9, or 17 timeslots. T2min<=T2<=the remaining delay budget of the service. A set of values of T2min is {1, 5, 10, 20}*2μ timeslots, wherein μ=0, 1, 2, or 3 corresponds to the case when the subcarrier interval is 15, 30, 60, or 120 kHz. The terminal determines T2min from the set of values according to the priority of its own data to be sent. For example, when the subcarrier interval is 15 kHz, the terminal determines T2min from the set {1, 5, 10, 20} according to the priority of its own data to be sent. When T2min is greater than or equal to the remaining delay budget of the service, T2 is equal to the remaining delay budget of the service. The remaining delay budget is a difference between the corresponding moment of the delay requirement of the data and the current moment. For example, a packet arriving in the timeslot n has a delay requirement of 50 milliseconds. Assuming that one timeslot is 1 millisecond, the remaining delay budget is 50 milliseconds in the case that the current moment is the timeslot n, and 30 milliseconds in the case that the current moment is the timeslot n+20.

The terminal sensing resources from n-TO to n-Tproc, 0 (excluding n-Tproc, 0), with TO taking a value of 100 or 1100 milliseconds. When the subcarrier interval is 15, 30, 60, or 120 kHz, Tproc, 0 is 1, 1, 2, or 4 timeslots. In fact, the terminal sensing the first sidelink control information sent by other terminals in every timeslot (except its own transmit timeslot). When resource selection or reselection is triggered in the timeslot n, the terminal uses the results of resource sensing from n−T0 to n−Tproc, 0.

In step 1, the terminal takes all the available resources belonging to the resource pool used by the terminal in the resource selection window 20 as a resource set A. Any resource in the set A is noted as R(x, y), wherein x and y indicate the frequency-domain location and time-domain location of the resource, respectively. The initial number of resources in the set A is noted as Mtotal. The terminal excludes the resources in the resource set A based on the non-sensing timeslots in the resource sensing window 10 (step 1-1) and/or the resource sensing results in the resource sensing window 10 (step 1-2). The terminal determines whether the resource R(x, y) or a series of periodic resources corresponding to the resource R(x, y) overlap the timeslot determined in step 1-1 based on the non-sensing timeslot or the resource determined in step 1-2 based on the sensed first sidelink control information, and excludes the resource R(x, y) from the resource set A in the case that the resources overlap.

In step 1-1, in response to having sent data in a timeslot m within the sensing window 10 without sensing, the terminal determines the corresponding Q timeslots based on the timeslot m and each of the permitted resource reservation periods in the resource pool used by the terminal at intervals of the resource reservation period. In the case that the Q timeslots overlap the resource R(x, y) or a series of periodic resources corresponding to the resource R(x, y), the resource R(x, y) is excluded from the resource pool A. Q=1 or Q=[$T_{scal}$/Prx] (which stands for rounding upwards). $T_{scal}$ is equal to the value of T2 upon being converted to milliseconds. Prx is one of the resource reservation periods allowed by the resource pool used by the terminal.

For example, in subfigure (a) of FIG. 4, the terminal does not perform sensing in the timeslot m and performs resource exclusion based on each of the resource reservation periods in a resource reservation period set M in the configuration of the resource pool used in turn. For one of the resource reservation periods 1, it is assumed that the Q-value is computed as 2, the corresponding Q timeslots are the next two timeslots identified by the horizontal line shadow in the subfigure (a) of FIG. 4 which are mapped from the timeslot m at intervals of the resource reservation period 1. For one of the resource reservation periods 2, it is assumed that the Q-value is computed as Q=1, the corresponding Q timeslots are the next 1 timeslot identified by the dotted shadow in subfigure (a) of FIG. 4 which are mapped from the timeslot m at intervals of the resource reservation period 2.

The terminal determines whether the Q timeslots corresponding to each reservation period overlap the resource R(x, y) or a series of periodic resources corresponding to the resource R(x, y), and excludes the resource R(x, y) from the resource set A in the case that the resources overlap.

In some embodiments, when inter-TB reservation is deactivated for the resource pool used by the terminal, the terminal may not perform step 1-1. In some embodiments, upon completion of step 1-1, the number of remaining resources in the resource set A are less than Mtotal*X %, then the resource set A is initialized to all the available resources belonging to the resource pool used by the terminal in the resource selection window 20, and then step 1-2 is performed.

In step 1-2, in response to having sensed the first sidelink control information transmitted in the PSCCH within the timeslot m of the resource sensing window 10, the terminal measures the sidelink reference signal received power (SL-RSRP) of the PSCCH or the SL-RSRP of the PSSCH scheduled by the PSCCH (i.e., the SL-RSRP of the PSSCH that is transmitted in the same timeslot as the PSCCH).

In the case that the measured SL-RSRP is greater than a SL-RSRP threshold and inter-TB resource reservation is activated for the resource pool used by the terminal, the terminal determines the corresponding Q timeslots based on the timeslot m and the resource reservation period carried in the sensed first sidelink control information at intervals of the resource reservation period. The terminal assumes that the first sidelink control information with the same content is also received in the Q timeslots. The terminal determines whether the resources indicated by the "time resource assignment" and "frequency resource assignment" domains of the first sidelink control information received in the timeslot m and the Q pieces of first sidelink control information assumed to have been received overlap the resource R(x, y) or a series of periodic resources corresponding to the resource R(x, y). In the case that the resources overlap, the corresponding resource R(x, y) is excluded from the set A. Q=1 or Q=[$T_{scal}$/Prx] (which stands for rounding upwards). $T_{scal}$ is equal to the value of T2 upon being converted into milliseconds. Prx is the resource reservation period carried in the sensed first sidelink control information.

For example, in subfigure (b) of FIG. 4, when inter-TB reservation is activated for the resource pool used by the terminal, in response to having sensed the first sidelink control information in the PSCCH on a resource E(v, m) of the timeslot m, which has a resource reservation period of Prx, and assuming that the Q-value is computed as 1, the terminal assumes that the first sidelink control information having the same content has been received on a timeslot m+Prx as well. The terminal determines whether the resources 1, 2, 3, 4, 5, and 6 indicated by the "time resource assignment" and "frequency resource assignment" domains of the first sidelink control information received in the timeslot m and the first sidelink control information assumed to have been received in the timeslot m+Prx overlap the resource R(x, y) or a series of periodic resources corresponding to the resource R(x, y). In the case that the resources overlap and the RSRP conditions are satisfied, the resource R(x, y) is excluded from the resource set A.

In the case that the SL-RSRP measured by the terminal is greater than a SL-RSRP threshold and the inter-TB resource reservation is deactivated for the resource pool used by the terminal, the terminal only determines whether the resources indicated by the "time resource assignment" domain and the "frequency resource assignment" domain of the first sidelink control information received in the timeslot m overlap the resource R(x, y) or a series of resources corresponding to the resource R(x, y), and excludes the resource R(x, y) from the resource set A in the case that the resources overlap.

For example, in subfigure (b) of FIG. 4, when inter-TB reservation is deactivated for the resource pool used by the terminal, in response to having sensed the first sidelink control information in the PSCCH on the resource E(v, m) of the timeslot m, the terminal determines whether the resources 1, 2, and 3 indicated by the "time resource assignment" domain and the "frequency resource assignment" domain of the first sidelink control information overlap the resource R(x, y) or a series of periodic resources corresponding to the resource R(x, y), and exclude the resource R(x, y) from the resource set A in the case that the resources overlap and the RSRP conditions are satisfied.

In the case that the number of remaining resources in the resource set A upon the resource exclusion is less than Mtotal*X %, the SL-RSRP threshold is raised by 3 dB and step 1 is performed again. The physical layer reports the resource set A upon the resource exclusion as a candidate resource set to the higher layer.

In step 2, the higher layer randomly selects resources from the reported candidate resource set to send data. That is, the terminal randomly selects resources from the candidate resource set to send data.

The following should be noted:

1. The SL-RSRP threshold is determined by a priority P1 carried in the PSCCH sensed by the terminal and a priority P2 of the data to be sent by the terminal. The configuration of the resource pool used by the terminal contains a table of SL-RSRP thresholds, which contains the SL-RSRP thresholds corresponding to all priority combinations. The configuration of the resource pool may be configured on the network or pre-configured.

For example, as listed in Table 1, it is assumed that the optional values of the priority levels of both P1 and P2 are 0-7, the SL-RSRP thresholds corresponding to different priority combinations are denoted by γij, wherein i in γij is the value of priority level P1 and j is the value of priority level P2.

TABLE 1

SL-RSRP thresholds

| P1 | P2: 0 | 1 | 2 | 3 | 4 | 5 | 6 | 7 |
|---|---|---|---|---|---|---|---|---|
| 0 | $\gamma_{00}$ | $\gamma_{01}$ | $\gamma_{02}$ | $\gamma_{03}$ | $\gamma_{04}$ | $\gamma_{05}$ | $\gamma_{06}$ | $\gamma_{07}$ |
| 1 | $\gamma_{10}$ | $\gamma_{11}$ | $\gamma_{12}$ | $\gamma_{13}$ | $\gamma_{14}$ | $\gamma_{15}$ | $\gamma_{16}$ | $\gamma_{17}$ |
| 2 | $\gamma_{20}$ | $\gamma_{21}$ | $\gamma_{22}$ | $\gamma_{23}$ | $\gamma_{24}$ | $\gamma_{25}$ | $\gamma_{26}$ | $\gamma_{27}$ |
| 3 | $\gamma_{30}$ | $\gamma_{31}$ | $\gamma_{32}$ | $\gamma_{33}$ | $\gamma_{34}$ | $\gamma_{35}$ | $\gamma_{36}$ | $\gamma_{37}$ |
| 4 | $\gamma_{40}$ | $\gamma_{41}$ | $\gamma_{42}$ | $\gamma_{43}$ | $\gamma_{44}$ | $\gamma_{45}$ | $\gamma_{46}$ | $\gamma_{47}$ |
| 5 | $\gamma_{50}$ | $\gamma_{51}$ | $\gamma_{52}$ | $\gamma_{53}$ | $\gamma_{54}$ | $\gamma_{55}$ | $\gamma_{56}$ | $\gamma_{57}$ |
| 6 | $\gamma_{60}$ | $\gamma_{61}$ | $\gamma_{62}$ | $\gamma_{63}$ | $\gamma_{64}$ | $\gamma_{65}$ | $\gamma_{66}$ | $\gamma_{67}$ |
| 7 | $\gamma_{70}$ | $\gamma_{71}$ | $\gamma_{72}$ | $\gamma_{73}$ | $\gamma_{74}$ | $\gamma_{75}$ | $\gamma_{76}$ | $\gamma_{77}$ |

In response to having sensed a PSCCH sent by another terminal, the terminal acquires a priority P1 carried in first sidelink control information transmitted in the PSCCH and a priority P2 of data to be sent. The terminal determines an SL-RSRP threshold by looking up Table 1.

2. Whether the terminal uses the measured PSCCH-RSRP or the PSSCH-RSRP scheduled by the PSCCH for comparison with the SL-RSRP threshold depends on the resource pool configuration of the resource pool used by the terminal. The resource pool configuration may be configured on the network or pre-configured.
3. Regarding X %, the possible values of X are {20, 35, 50}. The configuration of the resource pool used by the terminal contains a correspondence between the priority level and the possible values. The terminal determines the value of X based on the priority level of the data to be sent and this correspondence. The resource pool configuration may be configured on the network or pre-configured.

The introduction is an SL communication method in NR-V2X, i.e., the terminal autonomously selects transmission resources through resource sensing and transmits data on the sidelink autonomously. This SL communication method is also applicable various SL communications such as direct communication between handheld terminals, and direct communication between pedestrians and vehicles.

In addition, in NR-V2X, reevaluation is supported for resources that have been selected but not indicated by sending the first sidelink control information upon completion of the resource selection.

Figure 5:
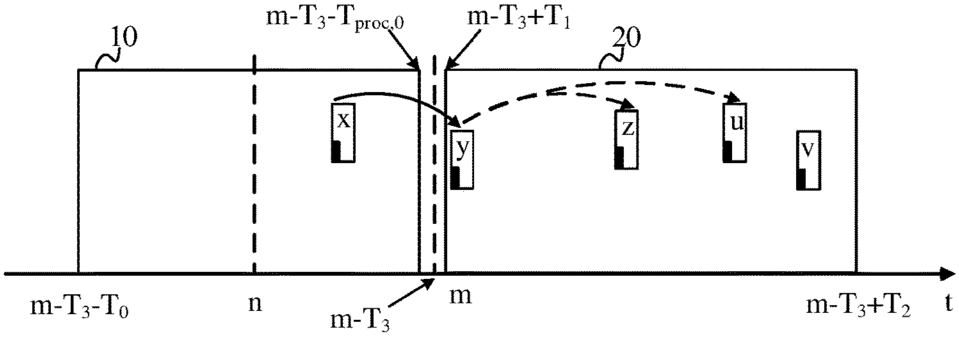
FIG. 5 exemplarily illustrates a schematic diagram of a resource reevaluation mechanism.

As illustrated in FIG. 5, resources x, y, z, u, and v are time-frequency resources that have been selected by the terminal in the timeslot n, and the resource y is located in the timeslot m. For resources z and u that the terminal is about to indicate for the first time by sending the first sidelink control information in the resource y (the resource y has been previously indicated by the first sidelink control information in the resource x), the terminal performs step 1 described above at least once in a timeslot m−T3. That is, the terminal determines the resource selection window 20 and the resource sensing window 10 at least in the timeslot m−T3 as described above, and performs step 1 to exclude the resources in the resource selection window 20 to obtain a candidate resource set. In the case that the resources z and/or u are not in the candidate resource set, the terminal performs step 2 to reselect the time-frequency resource from the resources z and u that is not in the candidate resource set. Depending on practice of the terminal, the terminal may also reselect any resource that has been selected but not indicated by sending the first sidelink control information, such as any one or more of the resources z, u and v. T3 is equal to Tproc, 1. The dashed arrows in FIG. 5 indicate that the first sidelink control information indication is to be sent, and the solid arrows indicate that the first sidelink control information indication has already been sent.

In addition, NR-V2X supports a resource preemption mechanism. For the resources that have been selected by a first terminal and have been indicated by sending the first sidelink control information, a second terminal may preempt these resources. The conclusion about the resource preemption mechanism is described from the perspective of the terminal whose selected resources are preempted, specifically as follows: upon completion of the resource selection, the terminal still continuously senses the first sidelink control information, and in the case that the resource that has been selected and has been indicated by sending the first sidelink control information satisfies the following three conditions, the resource has been preempted by another terminal, and the terminal triggers the resource reselection for the resource:

1. The resources indicated in the sensed first sidelink control information overlap the resources that have been selected and indicated by the terminal.
2. The SL-RSRP of the PSCCH corresponding to the sensed first sidelink control information or the SL-RSRP of the PSSCH scheduled by that PSCCH is greater than the SL RSRP threshold.
3. The priority carried in the sensed first sidelink control information is higher than the priority of the data to be sent by the terminal. Alternatively, the priority carried in the sensed first sidelink control information is higher than the priority of the data to be sent by the terminal, and the priority carried in the sensed first sidelink control information is higher than a threshold value U. U depends on the configuration of the resource pool, which may be configured on the network or pre-configured.

The first terminal and the second terminal are devices with transmission functions in NR V2X. The first terminal and the second terminal are two different terminals.

Figure 6:
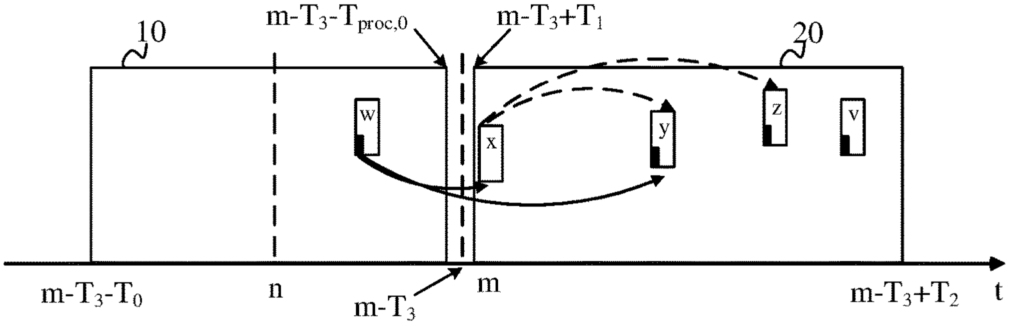
FIG. 6 exemplarily illustrates a schematic diagram of a resource preemption mechanism.

As shown in FIG. 6, the resources w, x, y, z, and v are time-frequency resources that have been selected by the terminal in the timeslot n, and the resource x is located in the timeslot m. For the resources x and y on which the terminal is about to send the first sidelink control information indication and which have been indicated by the first sidelink control information previously sent by the terminal, the terminal performs step 1 at least once in the timeslot m−T3. That is, the terminal determines the resource selection window 20 and the sensing window 10 as described above at least once in the timeslot m−T3, and performs step 1 to exclude the available resources in the resource selection window 20 and determine the candidate resource set. In the case that the resources x and/or y are not in the candidate resource set, whether they satisfy the three conditions is further determined. In response to determining that they satisfy the three conditions, the terminal performs step 2 to reselect the time-frequency resource from the resources x and y that satisfies the three conditions. In addition, when the resource reselection is triggered, depending on practice of the terminal, the terminal may reselect any resources that have been selected but not indicated by sending the first sidelink control information, such as any of the resources z and v. T3 is equal to Tproc, 1.

The introduction is one of the SL communication methods in NR-V2X, i.e., the terminal autonomously selects transmission resources through resource sensing and transmits data on the sidelink autonomously. This SL communication method is also applicable to various SL communications such as direct communication between handheld terminals and direct communication between pedestrians and vehicles.

The method for autonomous selection of transmission resources by the terminal by means of resource sensing does not take power saving into account. The resource selection method based on partial sensing is an energy-saving and power-saving resource selection method designed for power-sensitive terminals, such as handheld terminals, which achieves energy-saving and power-saving mainly by restricting the number of time units for resource selection and the number of time units for resource sensing.

A resource selection algorithm for partial sensing is hereinafter described in connection with FIG. 7. The terminal determines corresponding sensing timeslots based on at least Y timeslots determined within the resource selection window 20 and a resource reservation period set M or a subset of M in the resource pool configuration. In resource selection, resources in the at least Y timeslots are excluded based on the sensing results in the determined sensing timeslots and/or non-sensing timeslots. Exemplarily, the specific exclusion process can be seen in step 1, and resources are selected from the non-excluded resources therein to send data.

Figure 7:
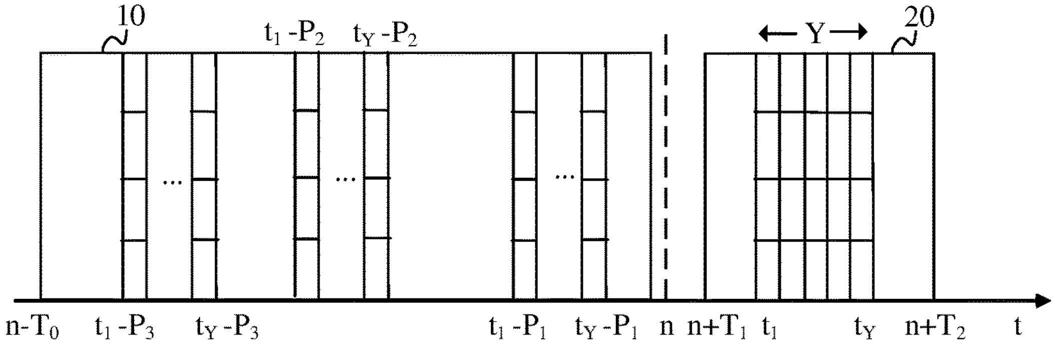
FIG. 7 exemplarily illustrates a schematic diagram of resource selection for partial sensing.

For example, in FIG. 7, it is assumed that the terminal determines a total of Y timeslots from t1 to ty in the resource selection window 20, and that the resource reservation period set M in the configuration of the resource pool used by the terminal includes periods P1, P2, and P3. The terminal determines, based on each of the resource reservation periods in the set M, and the Y timeslots, the sensing timeslots in the resource sensing window 10 as t1-P1 to ty-P1, t1-P2 to ty-P2 and t1-P3 to ty-P3. That is, based on the Y timeslots and each of the resource reservation periods, the corresponding timeslots belonging to a most recent period of the resource sensing window 10 are determined. In resource selection or reselection in the timeslot n, the terminal excludes the resources in the Y timeslots based on at least the sensing results within the timeslots determined in the resource sensing window 10 and/or non-sensing timeslots, for example, the terminal excludes the resources in the Y timeslots according to step 1, and ultimately selects the resources from the remaining resources in the Y timeslots to send data.

In some embodiments, in addition to the determined sensing timeslots, the terminal may also implement persistent sensing for [n+TA, n+TB], for example, TB=0, TA=−32 timeslots, and based on the determined sensing timeslots and the sensing results within [n+TA, n+TB] and/or the non-sensing timeslots, exclude the resources in the at least Y timeslots to obtain a candidate resource set, and select transmission resources from the candidate resource set.

In some embodiments, the mechanism of partial sensing described above is applicable to periodic transmissions. The location of the timeslot n is predicted based on the period, and in turn the resource selection window 20 is determined, from which at least Y timeslots are determined. Then the corresponding sensing timeslots are determined based on the at least Y timeslots, and sensing is performed when the time proceeds to a sensing timeslot. When the time proceeds to the timeslot n, resource selection or reselection is triggered, and transmission resources are selected from the at least Y timeslots.

In some embodiments, the at least Y timeslots described above may be contiguous timeslots or non-contiguous timeslots.

Figure 8:
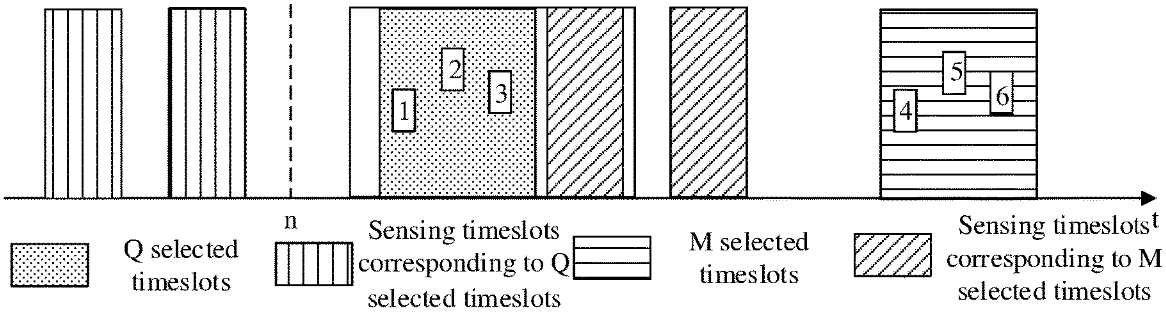
FIG. 8 exemplarily illustrates a schematic diagram of a resource reselection process.

In LTE SL, the reevaluation mechanism and the preemption mechanism are not supported. That is, in response to triggering resource selection or resource reselection in a subframe n and selecting a resource based on partial sensing, the terminal does not implement the reevaluation mechanism for unindicated resources or implement the preemption mechanism for resources that have been indicated to trigger resource reselection. In response to performing semi-persistent transmission or periodic transmission, upon completion of resource selection or reselection, the terminal generally indicates the resources for the next period for another TB transmission by using the resource reservation period domain in each period. For example, in FIG. 8, resources 1, 2, and 3 are selected in the subframe n based on partial sensing, and while the resources 1, 2, and 3 are being transmitted, the resource reservation period domain in the sidelink control information indicates resources 4, 5, and 6 for the next period. While the resources 4, 5, and 6 are being transmitted, the resource reservation period domain indicates resources for the next period, e.g., 7, 8, and 9. The terminal repeats this action until resource selection or reselection is triggered next time.

In NR SL, the reevaluation mechanism and the preemption mechanism are supported. In response to triggering resource selection or resource reselection in the timeslot n and selecting a resource based on partial sensing, the terminal triggers resource reselection due to resource conflict or resource preemption when implementing the reevaluation mechanism for an unindicated resource or implementing the preemption mechanism for an indicated resource. In response to performing semi-persistent transmission or periodic transmission, upon completion of resource selection or reselection, the terminal generally indicates resources for the next period for another TB transmission by using the resource reservation period domain in each period. In each period, the terminal may implement the reevaluation mechanism for unindicated resources and trigger resource reselection when a resource conflict occurs, and the terminal may also implement the preemption mechanism for indicated resources and trigger resource reselection when resource preemption occurs. In some embodiments, the reevaluation mechanism or the preemption mechanism may be activated or deactivated on a resource pool basis. For example, in FIG. 8, it is assumed that the preemption mechanism is activated for the resource pool used by the terminal, Q timeslots within the resource selection window 20 are determined in the timeslot n based on partial sensing, as well as the corresponding sensing timeslots, and resources 1, 2, and 3 are selected in the Q timeslots. While the resources 1, 2, and 3 are being transmitted, the resource reservation period domain in the first sidelink control information indicates resources 4, 5, and 6 for the next period. In the period corresponding to the resources 4, 5, and 6, the terminal triggers the preemption mechanism for the indicated resources since the resources 4, 5, and 6 have already been indicated by the first sidelink control information in the previous period. In the case that, in the preemption mechanism, the terminal finds that the resource 4 has been preempted and the terminal selects a new transmission resource, the terminal may also trigger the reevaluation mechanism before this new resource is indicated.

Figure 9:
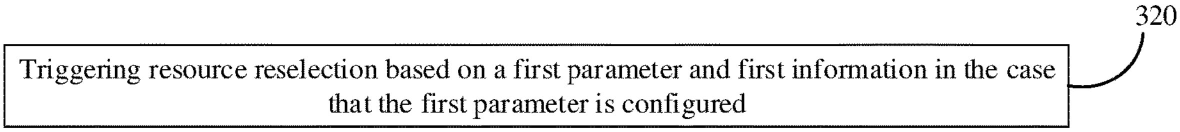
FIG. 9 is a flowchart of a resource reselection method according to some exemplary embodiments of the present disclosure.

FIG. 9 illustrates a flowchart of a resource reselection method according to some exemplary embodiments of the present disclosure. The method is applicable to the terminal as illustrated in FIG. 1, which adopts an autonomous resource selection mode (i.e., mode B) in V2X. The method includes the following steps.

In step 320, in the case that a first parameter being configured, resource reselection is triggered based on the first parameter and first information.

Exemplarily, the first parameter is a parameter sl-ReselectAfter, which is configured to determine a quantity threshold for triggering resource reselection. The first parameter is configured by a network device for a terminal, or, the first parameter is a pre-configured value. The first parameter may have a value range of an integer in the range of 1 to 9.

Exemplarily, the first information includes at least one of the following information:

Whether physical sidelink feedback channel (PSFCH) resources are configured in a resource pool.

A sidelink HARQ feedback mechanism is supported in NR and subsequent evolutionary systems. The sidelink HARQ feedback mechanism may be used in the case that the PSFCH resources are configured in the resource pool. The sidelink HARQ feedback mechanism may not be used in the case that no PSFCH resources are configured in the resource pool.

Usage of periodic transmission opportunities selected during resource selection, wherein the same set of periodic transmission opportunities includes up to n transmission opportunities, n being an integer greater than 2.

Periodic transmission opportunities are also referred to as periodic transmission resources and periodic time-frequency resources.

The same set of periodic transmission opportunities refer to transmission opportunities selected or reserved in the same resource selection period. Schematically, in the NR system, the same set of periodic transmission opportunities includes up to 32 transmission opportunities, i.e., n takes a value of 32.

For the terminal in V2X, a media access control (MAC) entity exists or runs within the terminal. The MAC entity creates sidelink processes when sidelink data transmission is required.

The sidelink process is configured to send a plurality of MAC PDUs to implement sidelink communication. When sidelink data to be sent exists in a logical channel, the terminal is triggered to implement a resource selection process. For details about the resource selection process, reference may be made to step 1 and step 2, which are not described herein any further. The resources selected by the terminal in the resource selection process may be a plurality of resources or a plurality of sets of periodic transmission opportunities.

Exemplarily, the resource reselection described above is based on sidelink process granularity.

In summary, in the method according to the embodiments, since the NR SL supports hybrid automatic repeat request (HARQ) feedback mechanism for sidelinks as well as the same set of periodic transmission opportunities including up to 32 transmission opportunities, the present disclosure is able to reasonably trigger resource reselection based on the first parameter by incorporating the characteristics of the enhanced sidelink transmissions provided by the NR SL, which in turn can ensure that the terminal makes reasonable use of the transmission opportunities in the resource pool. In this way, the terminal is prevented from using resources that have not been reserved for a long period of time, such that resource conflicts are avoided between the terminal and other terminals, and hence the performance of the entire communication system is enhanced.

Figure 10:
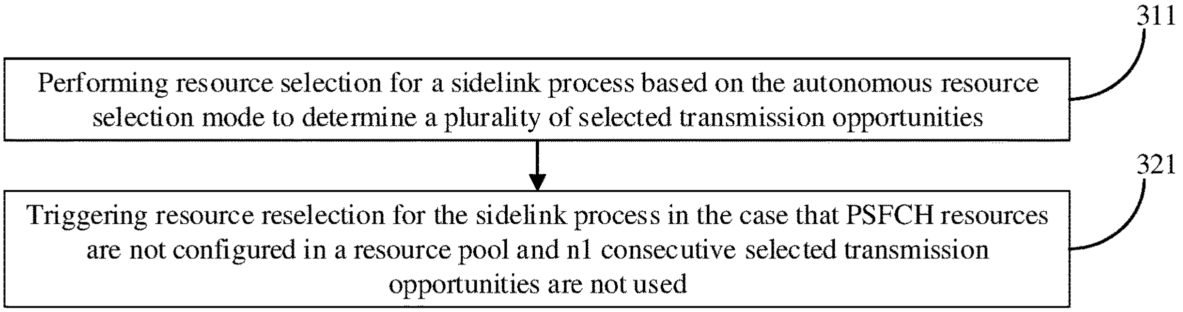
FIG. 10 is a flowchart of a resource reselection method according to some exemplary embodiments of the present disclosure.

FIG. 10 illustrates a flowchart of a resource reselection method according to some exemplary embodiments of the present disclosure. The method is applicable to the terminal as illustrated in FIG. 1, which adopts an autonomous resource selection mode (i.e., mode B) in V2X. The method includes the following steps.

In step 311, resource selection is performed for a sidelink process based on the autonomous resource selection mode to determine a plurality of selected transmission opportunities.

For the terminal in V2X, a MAC entity exists or runs within the terminal. The MAC entity creates a sidelink process when sidelink data transmission is required. The sidelink process is configured to send a plurality of MAC PDUs to enable sidelink communication.

The terminal will acquire the configuration of a resource pool in advance. The configuration of the resource pool includes time-domain information, frequency-domain information, effective duration, and resource type of the resource pool. The resource type includes at least one of a PSSCH resource, a PSCCH resource, or a PSFCH resource.

The terminal performs resource selection in the resource pool based on the autonomous resource selection mode. For details about the resource selection process, reference may be made to step 1 and step 2, which are not described herein any further. The transmission opportunities selected by the terminal in the resource selection process may be a plurality of transmission opportunities or a plurality of sets of periodic transmission opportunities. Schematically, in the NR system, the same set of periodic transmission opportunities includes up to 32 transmission opportunities.

In step 321, in the case that PSFCH resources are not configured in the resource pool and n1 consecutive selected transmission opportunities are not used, resource reselection is triggered for the sidelink process.

No PSFCH resources being configured in the resource pool means that the current sidelink transmission does not support the sidelink HARQ feedback mechanism. In the case that the sidelink HARQ feedback mechanism is not supported, a transmitter terminal is not aware of an HARQ feedback from a receiver terminal, and therefore may not trigger retransmission of the same TB based on the HARQ feedback.

n1 is a value indicated by a first parameter. Exemplarily, the first parameter is a parameter sl-ReselectAfter. For example, n1 is 2. In the case that the PSFCH resources are not configured in the resource pool and 2 consecutive selected transmission opportunities are not used, the terminal triggers resource reselection.

Figure 11:
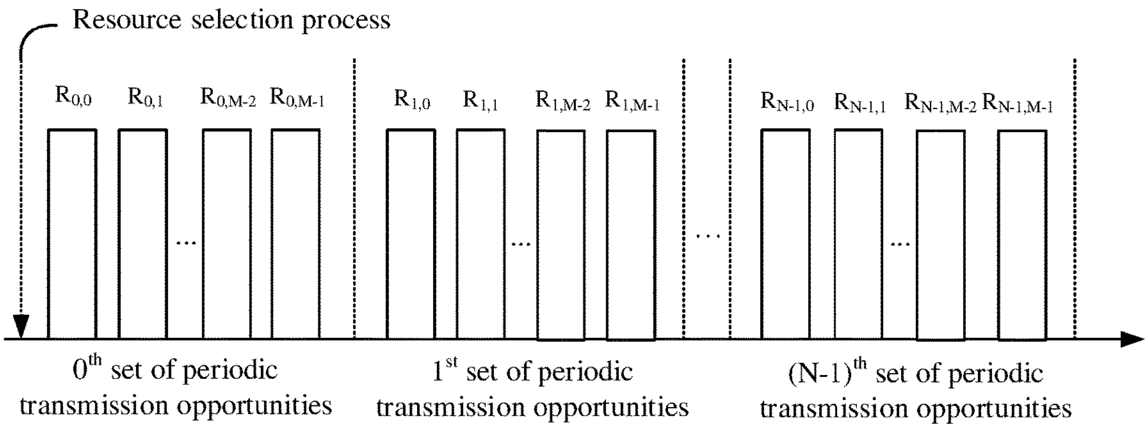
FIG. 11 is a schematic diagram of resource reservation according to some exemplary embodiments of the present disclosure.

Exemplarily referring to FIG. 11, one sidelink process of the terminal selects N sets of periodic transmission opportunities for transmission of M different MAC PDUs. For example, a $0^{th}$ set of periodic transmission opportunities includes M transmission opportunities $R_{0,0}$, $R_{0,1}$, $R_{0,2}$, $R_{0,3}$ . . . , $R_{0,M-1}$, and the M transmission opportunities are used for transmission of a $0^{th}$ MAC PDU; a $1^{st}$ set of periodic transmission opportunities includes M transmission opportunities $R_{1,0}$, $R_{1,1}$, $R_{1,2}$, $R_{1,3}$, . . . , $R_{1,M-1}$, and the M transmission opportunities are used for transmission of a $1^{st}$ MAC PDU; and so on, an $(M-1)^{th}$ set of periodic transmission opportunities includes M transmission opportunities $R_{N-1,0}$, $R_{N-1,1}$, $R_{N-1,2}$, $R_{N-1,3}$ . . . , $R_{M-1,M-1}$, and the M transmission opportunities are used for transmission an $(M-1)^{th}$ MAC PDU.

Within each set of periodic transmission opportunities, the terminal selects M transmission opportunities for new transmission and retransmission of the same MAC PDU, all of which form a sidelink grant. In the case that n1 consecutive transmission opportunities are not used starting from any one transmission opportunity in any one set of periodic transmission opportunities, the terminal triggers resource reselection for that sidelink process.

In summary, in the method according to the present embodiment, in the case that the current resource pool does not support the sidelink HARQ feedback mechanism and n1 consecutive transmission opportunities are not used, the terminal does not generate sidelink data for the current period of time, and triggers resource reselection. In this way, the terminal is prevented from using resources that have not been reserved for a long period of time, such that resource conflicts are avoided between the terminal and other terminals, and hence the performance of the entire communication system is enhanced.

Figure 12:
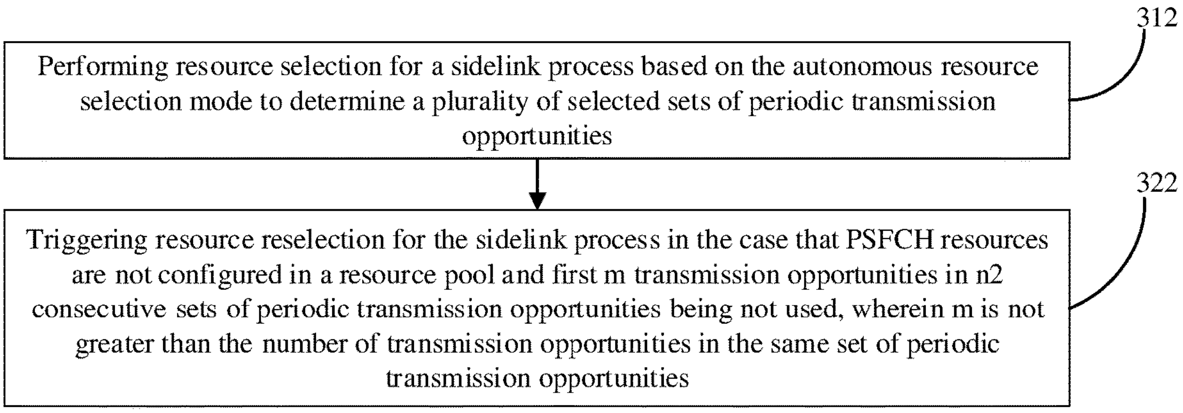
FIG. 12 is a flowchart of a resource reselection method according to some exemplary embodiments of the present disclosure.

FIG. 12 illustrates a flowchart of a resource reselection method according to some exemplary embodiments of the present disclosure. The method is applicable to the terminal as illustrated in FIG. 1, which adopts an autonomous resource selection mode (i.e., mode B) in V2X. The method includes the following steps.

In step 312, resource selection is performed for a sidelink process based on the autonomous resource selection mode to determine a plurality of selected sets of periodic transmission opportunities.

The terminal performs resource selection in a resource pool based on the autonomous resource selection mode. For details about the resource selection process, reference may be made to step 1 and step 2, which are not described herein any further. The transmission opportunities selected by the terminal in the resource selection process may be a plurality of transmission opportunities or a plurality of sets of periodic transmission opportunities. In this embodiment, the transmission opportunities selected by the terminal in the resource selection process are a plurality of sets of periodic transmission opportunities.

In step 322, in the case that the PSFCH resources are not configured in the resource pool and first m transmission opportunities in n2 consecutive sets of periodic transmission opportunities are not used, resource reselection is triggered for the sidelink process, wherein m is not greater than the number of transmission opportunities in the same set of periodic transmission opportunities.

No PSFCH resources being configured in the resource pool means that the current sidelink transmission does not support the sidelink HARQ feedback mechanism. In the case that the sidelink HARQ feedback mechanism is not supported, a transmitter terminal is not aware of an HARQ feedback from a receiver terminal, and therefore may not trigger retransmission of the same TB based on the HARQ feedback.

n2 is a rounded-up or rounded-down value of n1/2, and n1 is a value indicated by a first parameter. Exemplarily, the first parameter is sl-ReselectAfter, and n2=floor (sl-ReselectAfter/2) or ceil (sl-ReselectAfter/2).

For example, n1 is 3, and in the case that a second parameter is a rounded-up value of n1/2, then n2 is 2. In the case that the PSFCH resources are not configured in the resource pool and first m resources in 2 consecutive sets of periodic transmission opportunities are not used, resource reselection is triggered.

m is not greater than the number of transmission opportunities in the same set of periodic transmission opportunities. For example, m=2. m may be configured by a network device, determined autonomously by a terminal, or predefined by a communication protocol.

Exemplarily referring to FIG. 11, one sidelink process of the terminal selects N sets of periodic transmission opportunities for transmission of M different MAC PDUs. For example, a $0^{th}$ set of periodic transmission opportunities includes M transmission opportunities $R_{0,0}$, $R_{0,1}$, $R_{0,2}$, $R_{0,3}$ . . . , $R_{0,M-1}$, and the M transmission opportunities are used for transmission of a $0^{th}$ MAC PDU; a $1^{st}$ set of periodic transmission opportunities includes M transmission opportunities $R_{1,0}$, $R_{1,1}$, $R_{1,2}$, $R_{1,3}$ . . . , $R_{1,M-1}$, and the M transmission opportunities are used for transmission of a $1^{st}$ MAC PDU; and so on, an $(M-1)^{th}$ set of periodic transmission opportunities includes M transmission opportunities $R_{N-1,0}$, $R_{N-1,1}$, $R_{N-1,2}$, $R_{N-1,3}$ . . . , $R_{M-1,M-1}$, and the M transmission opportunities are used for transmission an $(M-1)^{th}$ MAC PDU.

In the case that $R_{i,0}$, $R_{i,1}$, $R_{i+1,0}$, $R_{i+1,1}$, . . . , $R_{i+S-1,0}$, $R_{i+S-1,1}$ are not used, the terminal triggers resource reselection for that sidelink process, wherein $0 \leq i < M-S$ and S=floor (sl-ReselectAfter/2) or ceil (sl-ReselectAfter/2). That is, since each set of periodic transmission opportunities is used for transmission of one MAC PDU, in the case that first two transmission opportunities in an $i^{th}$ set of periodic transmission opportunities are not used, it is highly probable that an $i^{th}$ MAC PDU is not generated in the terminal; in the case that first two transmission opportunities in an $(i+1)^{th}$ set of periodic transmission opportunities are not used, it is highly probable that an $(i+1)^{th}$ MAC PDU is not generated in the terminal; in the case that first two transmission opportunities in an $(i+2)^{th}$ set of periodic transmission opportunities are not used, it is highly probable that an $(i+2)^{th}$ MAC PDU is not generated in the terminal, and the like. In the case that first m transmission opportunities in n2 consecutive sets of periodic transmission opportunities are not used, n2 consecutive MAC PDUs are not generated in the terminal.

In summary, in the method according to the embodiments, in the case that the PSFCH resources are not configured in the current resource pool and first m transmission opportunities in n2 consecutive sets of periodic transmission opportunities being not used, the terminal does not generate sidelink data for the current period of time, and triggers resource reselection. In this way, the terminal is prevented from using resources that are not reserved for a long period of time, such that resource conflicts are avoided between the terminal and other terminals, and hence the performance of the whole communication system is enhanced.

Figure 13:
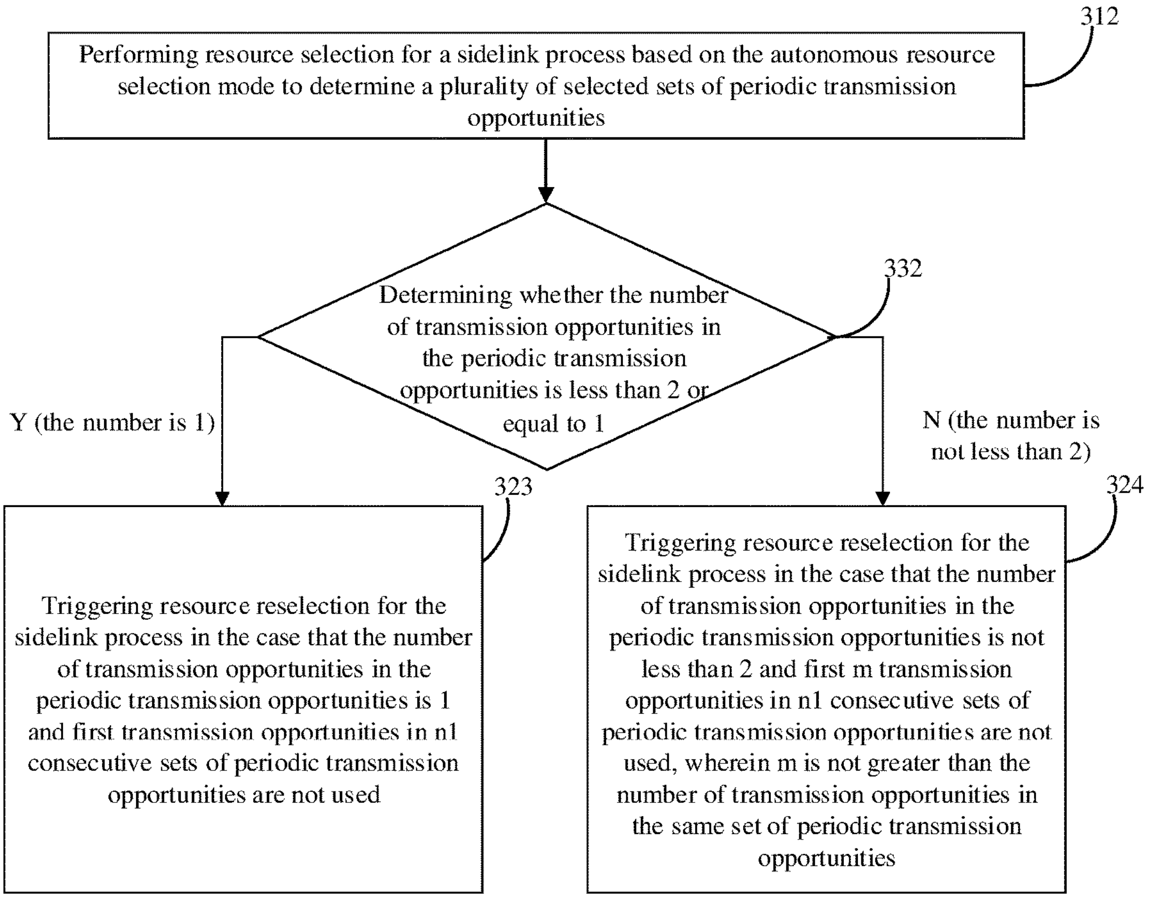
FIG. 13 is a flowchart of a resource reselection method according to some exemplary embodiments of the present disclosure.

FIG. 13 illustrates a flowchart of a resource reselection method according to some exemplary embodiments of the present disclosure. The method is applicable to the terminal as illustrated in FIG. 1, which adopts an autonomous resource selection mode (i.e., mode B) in V2X. The method includes the following steps.

In step 312, resource selection is performed for a sidelink process based on the autonomous resource selection mode to determine a plurality of selected sets of periodic transmission opportunities.

The terminal performs resource selection in the resource pool based on the autonomous resource selection mode. For details about the resource selection process, reference may be made to step 1 and step 2, which are not described herein any further. The transmission opportunities selected by the terminal in the resource selection process may be a plurality of transmission opportunities or a plurality of sets of periodic transmission opportunities. In this embodiment, the transmission opportunities selected by the terminal in the resource selection process are a plurality of sets of periodic transmission opportunities.

In step 332, whether the number of transmission opportunities in the periodic transmission opportunities is less than 2 or equal to 1 is determined.

In response to determining that the number of transmission opportunities in each set of periodic transmission opportunities is 1, step 323 is performed. In response to determining that the number of transmission opportunities in each set of periodic transmission opportunities is not less than 2, step 324 is performed.

In step 323, in the case that the number of transmission opportunities in the periodic transmission opportunities is 1 and first transmission opportunities in n1 consecutive sets of periodic transmission opportunities are not used, resource reselection is triggered for the sidelink process.

n1 is a value indicated by a first parameter. Exemplarily, the first parameter is a parameter sl-ReselectAfter.

For example, n1 is 2, and then in the case that first transmission opportunities in 2 consecutive sets of periodic transmission opportunities are not used, the terminal triggers resource reselection.

Exemplarily, referring to FIG. 11, starting from any set of periodic transmission opportunities, in the case that first transmission opportunities in n1 consecutive sets of periodic transmission opportunities are not used, for example, $R_{i,0}$, $R_{i+1,0}$, . . . , $R_{i+sl\text{-}ReselectAfter-1,0}$ are not used, the terminal triggers resource reselection for that sidelink process.

In step 324, in the case that the number of transmission opportunities in the periodic transmission opportunities is not less than 2 and first m transmission opportunities in n1 consecutive sets of periodic transmission opportunities are not used, resource reselection is triggered for the sidelink process, wherein m is not greater than the number of transmission opportunities in the same set of periodic transmission opportunities.

n1 is a value indicated by a first parameter. Exemplarily, the first parameter is a parameter sl-ReselectAfter. m is not greater than the number of transmission opportunities in the same set of periodic transmission opportunities. m may be configured by a network device, determined autonomously by a terminal, or predefined by a communication protocol.

For example, n1 is 2 and m=2, and then in the case that first two transmission opportunities in two consecutive sets of periodic transmission opportunities are not used, the terminal triggers resource reselection.

Exemplarily, referring to FIG. 11, in the case that $R_{i,0}$, $R_{i,1}$, $R_{i+1,0}$, and $R_{i+1,1}$ are not used, the terminal triggers resource reselection for that sidelink process. That is, since each set of periodic transmission opportunities is used for transmission of one MAC PDU, in the case that first two transmission opportunities in an $i^{th}$ set of periodic transmission opportunities are not used, it is highly probable that an $i^{th}$ MAC PDU is not generated in the terminal; and in the case that first two transmission opportunities in an $(i+1)^{th}$ set of periodic transmission opportunities are not used, it is highly probable that an $(i+1)^{th}$ MAC PDU is not generated in the terminal. In the case that first m transmission opportunities in n1 consecutive sets of periodic transmission opportunities are not used, then n1 consecutive MAC PDUs are not generated in the terminal. Exemplarily, in the embodiments, in the case that n1 is 2 and m=2, i.e., in the case that first two transmission opportunities in two consecutive sets of periodic transmission opportunities are not used, two consecutive MAC PDUs are not generated in the terminal.

In summary, in the method according to the embodiments, resource selection is triggered by selecting a reasonable m value according to the difference in the number of transmission opportunities in each set of periodic transmission opportunities. In this way, the terminal is prevented from using resources that have not been reserved for a long period of time, such that resource conflicts are avoided between the terminal and other terminals, and hence the performance of the entire communication system is enhanced.

Figure 14:
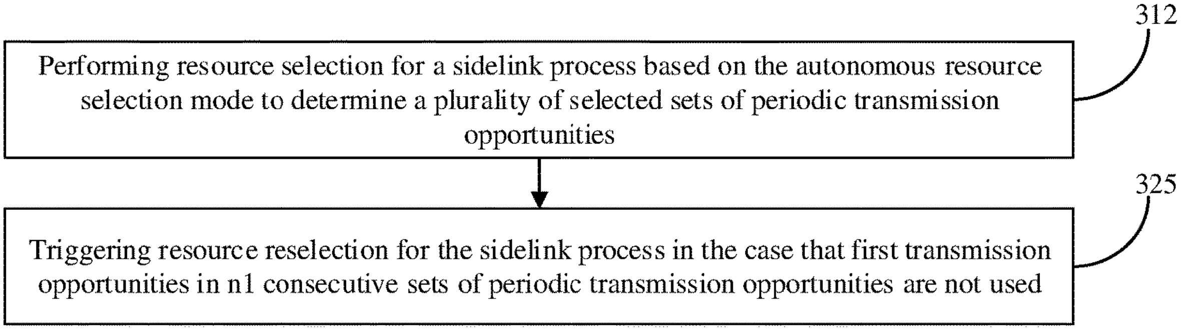
FIG. 14 is a flowchart of a resource reselection method according to some exemplary embodiments of the present disclosure.

FIG. 14 illustrates a flowchart of a resource reselection method according to some exemplary embodiments of the present disclosure. The method may be applicable to the terminal as illustrated in FIG. 1, which adopts an autonomous resource selection mode (i.e., mode B) in V2X. The method includes the following step.

In step 312, resource selection is performed for a sidelink process based on the autonomous resource selection mode to determine a plurality of selected sets of periodic transmission opportunities.

The terminal performs resource selection in the resource pool based on the autonomous resource selection mode. For details about the resource selection process, reference may be made to step 1 and step 2, which are not described herein any further. The transmission opportunities selected by the terminal in the resource selection process may be a plurality of transmission opportunities or a plurality of sets of periodic transmission opportunities. In the embodiments, the transmission opportunities selected by the terminal in the resource selection process are a plurality of sets of periodic transmission opportunities.

In step 325, in the case that first transmission opportunities in n1 consecutive sets of periodic transmission opportunities are not used, resource reselection is triggered for the sidelink process.

It should be noted that the number of transmission opportunities in each set of periodic transmission opportunities is not limited herein.

n1 is a value indicated by a first parameter. Exemplarily, the first parameter is a parameter sl-ReselectAfter.

For example, n1 is 2, and then in the case that first transmission opportunities in two consecutive sets of periodic transmission opportunities are not used, the terminal triggers resource reselection.

Exemplarily referring to FIG. 11, starting from any set of periodic transmission opportunities, in the case that first transmission opportunities in n1 consecutive sets of periodic transmission opportunities are not used, for example, $R_{i,0}$, $R_{i+1,0}$, . . . , $R_{i+sl\text{-}ReselectAfter-1,0}$ are not used, the terminal triggers resource reselection for that sidelink process.

In summary, in the method according to the embodiments, in the case that first transmission opportunities in n1 consecutive sets of periodic transmission opportunities are not used, a more concise trigger condition is defined, such that the terminal is enabled to trigger the resource reselection process with less computation. In this way, the terminal is prevented from using resources that have not been reserved for a long period of time, such that resource conflicts are avoided between the terminal and other terminals, and hence the performance of the entire communication system is enhanced.

Figure 15:
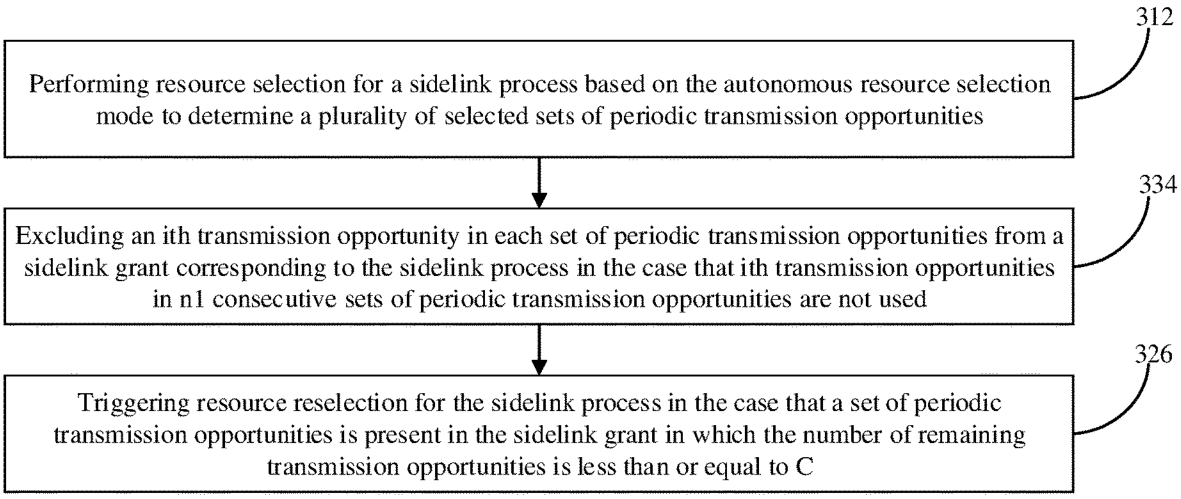
FIG. 15 is a flowchart of a resource reselection method according to some exemplary embodiments of the present disclosure.

FIG. 15 illustrates a flowchart of a resource reselection method according to some exemplary embodiments of the present disclosure. The method is applicable to the terminal as illustrated in FIG. 1, which adopts an autonomous resource selection mode (i.e., mode B) in V2X. The method includes the following steps.

In step 312, resource selection is performed for a sidelink process based on the autonomous resource selection mode to determine a plurality of selected sets of periodic transmission opportunities.

The terminal performs resource selection in the resource pool based on the autonomous resource selection mode. For details about the resource selection process, reference may be made to step 1 and step 2, which are not described herein any further. The transmission opportunities selected by the terminal in the resource selection process may be a plurality of transmission opportunities or a plurality of sets of periodic transmission opportunities. In the embodiments, the transmission opportunities selected by the terminal in the resource selection process are a plurality of sets of periodic transmission opportunities.

In step 334, in the case that $i^{th}$ transmission opportunities in n1 consecutive sets of periodic transmission opportunities are not used, an $i^{th}$ transmission opportunity in each set of periodic transmission opportunities is excluded from a sidelink grant corresponding to the sidelink process.

n1 is a value indicated by a first parameter. Exemplarily, the first parameter is a parameter sl-ReselectAfter.

i is not greater than the number of transmission opportunities in the same set of periodic transmission opportunities. Exemplarily, in the NR system, the same set of periodic transmission opportunities includes up to 32 transmission opportunities. Exemplarily, referring to FIG. 11, in the case that M=32, a $0^{th}$ set of periodic transmission opportunities includes 32 transmission opportunities $R_{0,0}$, $R_{0,1}$, $R_{0,2}$, $R_{0,3}$, . . . , $R_{0,31}$, wherein point i takes a value of up to 31.

Exemplarily referring to FIG. 11, one sidelink process of the terminal selects N sets of periodic transmission opportunities for the transmission of M different MAC PDUs. For example, a $0^{th}$ set of periodic transmission opportunities includes M transmission opportunities $R_{0,0}$, $R_{0,1}$, $R_{0,2}$, $R_{0,3}$ . . . , $R_{0,M-1}$, and the M transmission opportunities are used for transmission of a $0^{th}$ MAC PDU; a $1^{st}$ set of periodic transmission opportunities includes M transmission opportunities $R_{1,0}$, $R_{1,1}$, $R_{1,2}$, $R_{1,3}$, . . . , $R_{1,M-1}$, and the M transmission opportunities are used for transmission of a $1^{st}$ MAC PDU; and so on, an $(M-1)^{th}$ set of periodic transmission opportunities includes M transmission opportunities $R_{N-1,0}$, $R_{N-1,1}$, $R_{N-1,2}$, $R_{N-1,3}$, . . . , $R_{M-1,M-1}$, and the M transmission opportunities are used for transmission an $(M-1)^{th}$ MAC PDU.

In an example, a possible scenario where $i^{th}$ transmission opportunities in n1 consecutive sets of periodic transmission opportunities are not used is as follows: first transmission opportunities in n1 consecutive sets of periodic transmission opportunities are not used, but second transmission opportunities are used, which may be due to an offset between the period of generating MAC PDUs in the terminal and the resource reservation period.

In another example, a possible scenario where $i^{th}$ transmission opportunities in n1 consecutive sets of periodic transmission opportunities are not used is as follows: second transmission opportunities in n1 consecutive sets of periodic transmission opportunities are not used, but first transmission opportunities are used, and this may be due to the fact that the terminal receives an ACK feedback after each transmission of a MAC PDU in case the sidelink HARQ feedback mechanism is supported.

For these cases, the terminal may exclude the $i^{th}$ transmission opportunity in each set of periodic transmission opportunities from the sidelink grant corresponding to the sidelink process.

Without excluding some possible embodiments, the terminal may also exclude from the sidelink grant corresponding to the sidelink process both the $i^{th}$ transmission opportunity in each set of periodic transmission opportunities as well as the transmission opportunities after the $i^{th}$ transmission opportunity.

In step 326, resource reselection is triggered for the sidelink process in the case that a set of periodic transmission opportunities is present in the sidelink grant in which the number of remaining transmission opportunities is less than or equal to C.

Exemplarily, with respect to the value of C, the following situations are non-exclusively included:

The value of C is determined by the terminal.

The value of C is 0.

The value of C is equal to the number of sidelink data transmissions in a logical channel minus 1.

As one example, in the case that HARQ feedback is activated for the current logical channel, i.e., an sl-HARQ-FeedbackEnabled parameter is configured as enabled, the value of C is determined by practice of the terminal; and otherwise, the value of C is equal to the number of data transmissions in the current logical channel determined by the MAC layer of the terminal minus 1.

As another example, in the case that the HARQ feedback is activated for the current logical channel, i.e., the sl-HARQ-FeedbackEnabled parameter is configured as enabled, the value of C is 0; and otherwise, the value of C is equal to the number of data transmissions in the current logical channel determined by the MAC layer of the terminal minus 1.

The value of C is $C_i$.

$C_i$ is equal to the number of initial transmission opportunities in one set of periodic transmission opportunities of the sidelink grant corresponding to the sidelink process minus 1.

For example, in the case that the HARQ feedback is activated for the current logical channel, i.e., the sl-HARQ-FeedbackEnabled parameter is configured as enabled, the value of C is 0; and otherwise, the value of C is equal to the number of initial resources in one set of periodic resources in the current sidelink grant minus 1.

The value of C is $C_i*\alpha$.

$C_i$ is equal to the number of initial transmission opportunities in one set of periodic transmission opportunities of the sidelink grant corresponding to the sidelink process minus 1, and a is a number greater than 0 and less than 1.

As one example, in the case that the HARQ feedback is activated for the logical channel, the value of C is determined by the terminal. As another example, in the case that the HARQ feedback is not activated for the logical channel, the value of C is equal to the number of sidelink data transmissions in the logical channel minus 1. As yet another example, in the case that the HARQ feedback is not activated for the logical channel, the value of C is $C_i$, wherein $C_i$ is equal to the number of initial transmission opportunities in one set of periodic transmission opportunities of the sidelink grant corresponding to the sidelink process minus 1.

$0<\alpha<1$, the exact value of a may be configured by a network, or preconfigured, or predefined by a communication protocol.

In summary, in the method according to the embodiments, by excluding the $i^{th}$ transmission opportunity in each set of periodic transmission opportunities from the sidelink grant corresponding to the sidelink process in the case that $i^{th}$ transmission opportunities in n1 consecutive sets of periodic transmission opportunities being not used, resources that are unlikely to be used subsequently are excluded in advance and left for use by other terminals, improving the performance of the entire system.

In addition, in case there exists one set of periodic transmission opportunities in the sidelink grant in which the number of remaining transmission opportunities is less than or equal to C, it is considered that the remaining transmission opportunities in each set of periodic transmission opportunities are no longer able to satisfy the transmission demand, and resource reselection is triggered, ensuring the reliability of data transmission at the terminal.

It should be noted that the above embodiments may be divided and combined in any way by the person skilled in the art. Optionally, "transmission opportunity" in the above embodiments can be understood as "resource." For example, one transmission opportunity corresponds to one resource, or one resource is one transmission opportunity.

Figure 16:
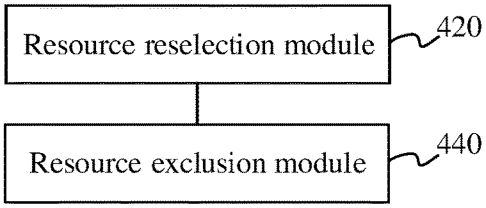
FIG. 16 is a block diagram of a resource reselection apparatus according to some exemplary embodiments of the present disclosure.

FIG. 16 illustrates a block diagram of a resource reselection apparatus according to some exemplary embodiments of the present disclosure. The apparatus includes:

a resource reselection module 420, configured to trigger resource reselection based on a first parameter and first information in the case that the first parameter is configured;

wherein the first information includes at least one of: whether physical sidelink feedback channel (PSFCH) resources are configured in a resource pool; or usage of periodic transmission opportunities selected during a resource selection process, wherein the same set of periodic transmission opportunities includes up to n transmission opportunities, n being an integer greater than 2.

In some embodiments, the resource reselection module 420 is configured to trigger resource reselection for a sidelink process in the case that the PSFCH resources are not configured in the resource pool and n1 consecutive selected transmission opportunities being not used;

wherein n1 is a value indicated by the first parameter.

In some embodiments, the resource reselection module 420 is configured to trigger resource reselection for a sidelink process in the case that the PSFCH resources are not configured in the resource pool and first m transmission opportunities in n2 consecutive sets of periodic transmission opportunities are not used, m being not greater than the number of transmission opportunities in the same set of periodic transmission opportunities;

wherein n2 is a rounded-up or rounded-down value of n1/2, and n1 is a value indicated by the first parameter.

In some embodiments, the resource reselection module 420 is configured to trigger resource reselection for a sidelink process in the case that the number of transmission opportunities in the periodic transmission opportunities is not less than 2 and first m transmission opportunities in n1 consecutive sets of periodic transmission opportunities are not used, wherein m is not greater than the number of transmission opportunities in the same set of periodic transmission opportunities; or the resource reselection module 420 is configured to trigger resource reselection for a sidelink process in the case that the number of transmission opportunities in the periodic transmission opportunities is 1 and first transmission opportunities in n1 consecutive sets of periodic transmission opportunities are not used;

wherein n1 is a value indicated by the first parameter.

In some embodiments, the resource reselection module 420 is configured to trigger resource reselection for a sidelink process in the case that first transmission opportunities in n1 consecutive sets of periodic transmission opportunities are not used;

wherein n1 is a value indicated by the first parameter.

In some embodiments, the apparatus further includes a resource exclusion module 440.

The resource exclusion module 440 is configured to exclude an $i^{th}$ transmission opportunity in each set of periodic transmission opportunities from a sidelink grant corresponding to a sidelink process in the case that $i^{th}$ transmission opportunities in n1 consecutive sets of periodic transmission opportunities are not used; and the resource reselection module 420 is configured to trigger resource reselection for the sidelink process in the case that a set of periodic transmission opportunities is present in the sidelink grant in which the number of remaining transmission opportunities is less than or equal to C;

wherein n1 is a value indicated by the first parameter.

In some embodiments, a value of C is determined by the terminal; or a value of C is 0; or a value of C is equal to the number of sidelink data transmissions in a logical channel minus 1; or a value of C is $C_i$, wherein $C_i$ is equal to the number of initial transmission opportunities in a set of periodic transmission opportunities of the sidelink grant corresponding to the sidelink process minus 1; or a value of C is $C_i*\alpha$, wherein $C_i$ is equal to the number of initial transmission opportunities in a set of periodic transmission opportunities of the sidelink grant corresponding to the sidelink process minus 1, and $\alpha$ is a number greater than 0 and less than 1.

In some embodiments, the value of C is determined by the terminal in the case that HARQ feedback is activated for the logical channel; or the value of C is equal to the number of sidelink data transmissions in the logical channel minus 1 in the case that HARQ is not activated for the logical channel; or the value of C is $C_i$ in the case that HARQ feedback is not activated for the logical channel.

In some embodiments, the first parameter is a parameter sl-ReselectAfter.

It should be noted that the apparatus according to the above embodiments is only exemplified by the division of the above-described individual functional modules when implementing its functions, and in practice, the functions can be assigned to different functional modules for implementation according to the actual needs, i.e., the content structure of the apparatus can be divided into different functional modules in order to implement all or part of the above-described functions.

Regarding the apparatus in the above embodiment, the resource reselection module 420 is configured to perform step 320, step 321, step 322, step 323, step 324, step 325, and step 326 in the above method embodiment; and the resource exclusion module 440 is configured to perform step 334 in the above method embodiment. In some embodiments, the apparatus further includes a resource selection module configured to perform step 311 and step 312 in the method embodiment.

Figure 17:
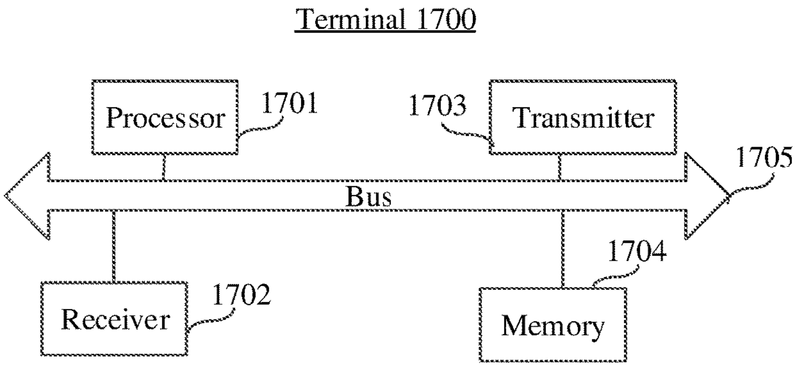
FIG. 17 is a block diagram of a terminal according to some exemplary embodiments of the present disclosure.

FIG. 17 illustrates a schematic structural diagram of a terminal according to some exemplary embodiments of the present disclosure. The terminal 1700 includes a processor 1701, a receiver 1702, a transmitter 1703, a memory 1704, and a bus 1705.

The processor 1701 includes one or more processing cores, and the processor 1701 performs various functional applications as well as information processing by running software programs as well as modules.

The receiver 1702 and the transmitter 1703 may be implemented as a communication component, which may be a communication chip.

The memory 1704 is connected to the processor 1701 via the bus 1705.

The memory 1704 may be configured to store the at least one instruction, and the processor 1701 is configured to execute the at least one instruction to implement the various steps in the method embodiments described above.

In addition, the memory 1704 may be implemented by any type of volatile or non-volatile storage device or a combination thereof, volatile or non-volatile storage devices including, but not limited to: a magnetic disk or an optical disk, an electrically erasable programmable read-only memory (EEPROM), an erasable programmable read-only memory (EPROM), a static random-access memory (SRAM), a read-only memory (ROM), a magnetic memory, a flash memory, and a programmable read-only memory (PROM).

Some exemplary embodiments further provide a non-transitory computer-readable storage medium. The computer-readable storage medium has stored therein at least one instruction, at least one program, a code set, or a set of instructions. The at least one instruction, the at least one program, and the code set or set of instructions, when loaded and executed by a processor, causes the processor to perform a resource reselection method according to any of the above method embodiments.

Some exemplary embodiments further provide a chip. The chip includes programmable logic circuitry and/or program instructions. The chip, when running on a computer device, is configured to perform a resource reselection method according to any of the above method embodiments.

Some exemplary embodiments further provide a computer program product. The computer program product, when loaded and run on a processor of a computer device, causes the computer device to perform a resource reselection method according to any of the above method embodiments.

A person of ordinary skill in the art may understand that all or some of the steps for realizing the above embodiments may be accomplished by hardware, or may be accomplished by a program that instructs the relevant hardware to do so, and the program may be stored in a computer-readable storage medium, and that the storage medium referred to above may be a read-only memory, a disk, a CD-ROM, or the like.

Described above are merely some exemplary embodiments of the present disclosure, and are not intended to limit the present disclosure. Within the spirit and principles of the disclosure, any modifications, equivalent substitutions, improvements, and the like fall within the protection scope of the present disclosure.

The invention claimed is:

1. A resource reselection method, applicable to a terminal adopting an autonomous resource selection mode, the method comprising:

triggering resource reselection for a sidelink process in a case that a number of transmission opportunities in each of sets of periodic transmission opportunities selected during a resource selection process is not less than 2 and first m transmission opportunities in n1 consecutive sets of periodic transmission opportunities are not used, m being not greater than a number of transmission opportunities in a same set of periodic transmission opportunities;

wherein n1 is a value indicated by a first parameter.

2. The method according to claim 1, wherein the same set of periodic transmission opportunities comprises transmission opportunities selected or reserved in a same resource selection period.

3. The method according to claim 1, wherein the first parameter is a parameter sl-ReselectAfter.

4. The method according to claim 1, further comprising:

triggering the resource reselection for the sidelink process in a case that the number of transmission opportunities in each of the sets of periodic transmission opportunities selected during the resource selection process is 2 and first two transmission opportunities in n1 consecutive sets of periodic transmission opportunities are not used.

5. A terminal, comprising: a processor and a memory; wherein the memory stores at least one program; and the processor, when loading and running the at least one program in the memory, is caused to perform:

triggering resource reselection for a sidelink process in a case that a number of transmission opportunities in each of sets of periodic transmission opportunities selected during a resource selection process is not less than 2 and first m transmission opportunities in n1 consecutive sets of periodic transmission opportunities are not used, m being not greater than a number of transmission opportunities in a same set of periodic transmission opportunities;

wherein n1 is a value indicated by a first parameter.

6. The terminal according to claim 5, wherein the same set of periodic transmission opportunities comprises transmission opportunities selected or reserved in a same resource selection period.

7. The terminal according to claim 5, wherein the processor is further caused to perform:

triggering the resource reselection for the sidelink process in a case that the number of transmission opportunities in each of the sets of periodic transmission opportunities selected during the resource selection process is 2 and first two transmission opportunities in n1 consecutive sets of periodic transmission opportunities are not used.

8. The terminal according to claim 5, wherein the first parameter is a parameter sl-ReselectAfter.

9. A non-transitory computer readable storage medium having executable instructions stored therein; wherein the executable instructions, when loaded and executed by a processor, cause the processor to perform:

triggering resource reselection for a sidelink process in a case that a number of transmission opportunities in each of sets of periodic transmission opportunities selected during a resource selection process is not less than 2 and first m transmission opportunities in n1 consecutive sets of periodic transmission opportunities are not used, m being not greater than a number of transmission opportunities in a same set of periodic transmission opportunities;

wherein n1 is a value indicated by a first parameter.

10. The non-transitory computer readable storage medium according to claim 9, wherein the same set of periodic transmission opportunities comprises transmission opportunities selected or reserved in a same resource selection period.

11. The non-transitory computer readable storage medium according to claim 9, wherein the processor is further caused to perform:

triggering the resource reselection for the sidelink process in a case that the number of transmission opportunities in each of the sets of periodic transmission opportunities selected during the resource selection process is 2 and first two transmission opportunities in n1 consecutive sets of periodic transmission opportunities are not used.

12. The non-transitory computer readable storage medium according to claim 9, wherein the first parameter is a parameter sl-ReselectAfter.

* * * * *